United States Patent [19]

Glass

[11] Patent Number: 4,465,554
[45] Date of Patent: Aug. 14, 1984

[54] HOT JET EVAPORATOR

[75] Inventor: John R. Glass, Mickleton, N.J.

[73] Assignee: Mobil Oil Corporation, New York, N.Y.

[21] Appl. No.: 352,416

[22] Filed: Feb. 25, 1982

[51] Int. Cl.$^3$ ............ B01D 1/14; B01D 1/30; B01L 11/02

[52] U.S. Cl. .............. 159/16 R; 159/29; 159/44; 422/101; 422/106; 422/111

[58] Field of Search ........... 159/16 R, 29, 31, 44; 422/70, 101, 106, 109, 111, 289; 73/863.12, 863.21

[56] References Cited

U.S. PATENT DOCUMENTS

| 1,992,458 | 2/1935 | Baden | 159/16 R |
| 3,094,468 | 6/1963 | Topham | 422/106 |
| 3,364,731 | 1/1968 | Hook | 422/106 |
| 3,536,450 | 10/1970 | Dus et al. | 422/70 |
| 3,847,200 | 11/1974 | Kopp et al. | 159/16 R |
| 3,977,935 | 8/1976 | Kowarski | 159/44 |
| 4,265,857 | 5/1981 | Kelada et al. | 422/101 |

FOREIGN PATENT DOCUMENTS 793588  1/1981  U.S.S.R. ............... 422/101

Primary Examiner—Bradley Garris
Attorney, Agent, or Firm—Alexander J. McKillop; Michael G. Gilman; Laurence P. Hobbes

[57] ABSTRACT

An apparatus for evaporating liquid fractions is disclosed. The apparatus includes a nozzle from which a hot stream of non-reactive gas is directed onto the surface of the fraction that is to be evaporated, while the fraction and the nozzle are thermally insulated and sealed from the surrounding atmosphere. Means are disclosed for electronically, automatically controlling the evaporation process. A process for the effective evaporation of liquid fractions is also disclosed and claimed.

12 Claims, 2 Drawing Figures

HOT JET EVAPORATOR

BACKGROUND OF THE INVENTION

1. Field of the Invention

This invention relates to the art of evaporation of the solvent or eluent of liquid fractions, such as those obtained from extraction or liquid chromatography, whose evaporation is necessary for analysis of the substances dissolved or carried therein. Specifically, this invention comprises an apparatus and a method for evaporating such solvents by application of a heated jet of non-reactive gas to the surface of the sample to be evaporated.

2. Description of the Prior Art

In the practice of analytical chemistry, the weighing and subsequent analysis of isolated fractions of substances undergoing testing or identification is frequently a critical step. This frequently requires evaporation of the solvent or eluent of the fractions. The usual method for evaporating simple liquid fractions is to place them in a beaker or other laboratory vessel and then place the vessel on a hot plate or the like to heat it from underneath. A frequently observed phenomenon when this type of heating is practiced is the tendency of the liquid fraction sample to creep up the walls of the container and out. To overcome this problem, a special beaker is sometimes employed. This beaker, an "inverted rim beaker", is expensive, fragile, difficult to weigh and difficult to clean. The use of such beakers requires subsequent redissolving of the fraction and complicated weighing procedures in order to secure reliable results.

Some fractions separate into two or more phases with the non-volatile oil phase on top. When heat is applied beneath these samples, the lower volatile phase may evaporate explosively, causing a loss of the sample to be evaporated and putting a halt to subsequent analysis. Types of mixtures which present this practical obstacle to analysis are often encountered in laboratory work.

Due to the problem described, such fractions are usually evaporated with a rotary evaporator. The rotary evaporator works on the theory that evaporation is best achieved with a large surface area and under a vacuum. The fraction is manually transferred to a large round-bottomed flask. A liquid bath is carefully jacked up under the flask and the motor of the evaporator is started. Vacuum is carefully applied to the flask and regulated manually by observing the evaporation. Too little vacuum results in the evaporation taking too long, and too much vacuum results in the fraction blowing over into the condenser and slop flask. Additionally, the rotary seal of the evaporator commonly requires numerous bearings and gives a very short useful life, on the order of six months. While the seal is wearing out, the grease and debris therefrom may end up in the fraction, spoiling subsequent analysis.

When evaporation with a rotary evaporator is completed, the residue is spread in a thin film over the large inside surface of the flask. The outside is coated with a film of dirty bath liquid. The motor is turned off and the bath is jacked down. The outside of the flask must then be cleaned. To remove the flask, heating with a torch may be required if the joint sticks. Frequently, the heating may result in cracking, and as a result, grease gets inside the flask, and admitted air may oxidize the residue. The residue is then redissolved in a small amount of solvent, transferred to a smaller weighable container and evaporated again while being watched to make sure that the residue does not overheat, after the solvent has been removed.

In prior art practice, therefore, the skilled chemist is frequently presented with fractions whose weighing and subsequent analysis is critical, but to whom a practical means of properly preparing the fraction is unavailable, making it difficult and expensive to secure reliable results.

I have therefore invented an apparatus and method for evaporating such liquid fractions which does not require the use of equipment that is expensive and difficult to handle, does not require manual observation and control, does not require difficult, tedious or repetitive manual steps to isolate the fraction, and, at the same time, provides uncontaminated residues that may be easily weighed and analyzed.

SUMMARY OF THE INVENTION

The invention herein resides in the discovery that heat for evaporation of a liquid fraction may be supplied directly to the surface of the liquid fraction by a heated stream of nitrogen or other non-reactive gas.

The jet of hot gas impinges on the surface of the liquid with a velocity of about 65 meters per second. Because of their temperature the gas molecules have an additional thermal velocity of about 10 times this. This combined high velocity is effective in breaking up any surface film. The evaporation proceeds efficiently without the need for a large surface area or movement of any part of the apparatus.

By enclosing the fraction container in a thermally insulated flask the heat is conserved making the evaporation more efficient. Thermal insulation also enables a single thermal sensor to perform three functions: controlling both the level and temperature of the liquid and also the shutting down of the apparatus when the evaporation is complete.

Accordingly, disclosed and claimed herein is a process and apparatus whereby a stream of appropriate gas is first heated and then directed to the surface of the liquid fraction to be evaporated. Since the evaporation does not require a large surface area, ordinary, inexpensive and weighable beakers or other containers may be used to contain the residue. Means are also provided for automatically controlling the temperature of the gas, and that of the liquid fraction and for automatically ceasing the evaporative process once complete evaporation is sensed. Evaporation of large fractions may thereby be carried out overnight, without the presence of skilled personnel.

Various other features and advantages of the invention will be more fully understood by reference to the drawings and accompanying description below.

DETAILED DESCRIPTION OF THE PREFERRED EMBODIMENT

The apparatus and process of this invention are generally suitable for the evaporation of any liquid fraction wherein the solvent or eluent has a characteristic boiling point in the range of about 20° C. to about 120° C.

Such solvents are commonly encountered in the arts of extraction and liquid chromatography, and the invention has particular utility in the evaporation of fractions obtained from an extraction or a liquid chromatograph. The apparatus is illustrated as receiving a fraction from a liquid chromatograph, although this is only a non-restrictive example of a preferred embodiment of my invention.

Figure 1:
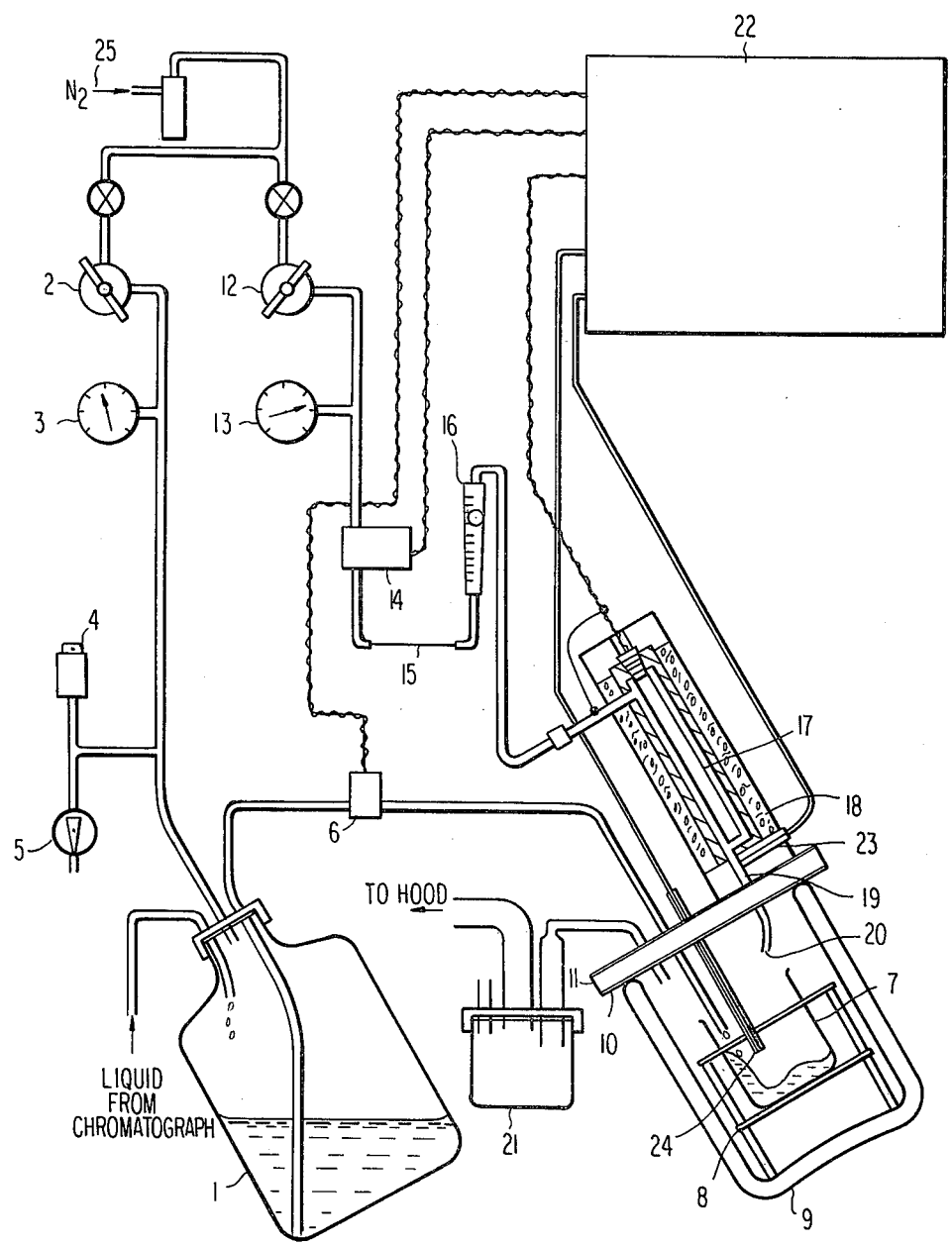
FIG. 1 is a schematic illustration of a preferred embodiment of the apparatus of this invention.

As pictured in FIG. 1, the liquid fraction from the chromatograph or other source is collected in a reservoir 1 of suitable size. There are no limitations on the size but generally, this reservoir may be an ordinary screw-cap bottle ranging in volume from 0.1 to 4 liters. A pressure regulator 2 and gauge 3 supply filtered nitrogen or other non-reactive gas to the reservoir at a pressure, e.g., of about 3 psig. Gravity, rather than pressure, may be employed to cause the fraction to feed from the reservoir. A safety valve 4 prevents excess pressure from being accidentally applied to the reservoir. A needle valve 5 bleeds nitrogen at, e.g., a few ml per minute to prevent pressure build-up in the reservoir when liquid is being fed into it faster than the liquid is being removed.

In alternative embodiments, the need for the use of a reservoir can be avoided by transferring the liquid fraction directly from the source to the fraction container 7. This embodiment is particularly suited to the evaporation of small fractions, where control over the amount fed to the fraction container would not be necessary, or where the process unit, e.g., an extractor or chromatograph, is automatically controlled.

The liquid fraction is fed as needed through a Teflon solenoid valve 6 into the fraction container 7 where it is to be evaporated. The fraction containers can be beakers from about 10 to about 150 ml in size or jars from about 17 ml to 4 oz. Stainless steel or aluminum beakers can be used when extremely high accuracy in weighing is needed. The fraction container is held in a rack 8 designed to support the container at an angle so that the hot nitrogen or other non-reactive gas used to evaporate the fraction impinges onto the liquid at the lower corner of the container, as shown. The container is preferably sealed within a vacuum walled or other type of insulated flask 9 sealed against a Viton gasket 10 about 1/16 inch in thickness, backed up by a ¼ inch thick rubber sponge 11. The seal prevents contamination of the fraction by air or leakage of vapors into the laboratory. This eliminates the necessity for operating under a hood.

A second pressure regulator 12 and gauge 13 supply the non-reactive gas through a solenoid valve 14 to a flow restrictor 15, about 0.033 inches in internal diameter by about 11 inches long which gives a flow of about 3 liters per minute as measured by a flow meter 16. The gas is then directed to a heater 17, provided with insulation 18, which heats the gas to a temperature sufficient to evaporate all the necessary eluent or solvent, generally from about 30° C. to about 200° C. The gas then passes, in stainless steel tubing 19, through the gasket and out through a nozzle or jet 20 which is about 1 mm in internal diameter.

Some liquids that may be used as solvents or eluents, such as pyridine, that have a vapor pressure at room temperature of less than about 100 mm of mercury require a trap 21 to prevent condensation in the line to the hood (not illustrated). Excess air is bled into the trap and will eventually empty it automatically by evaporation. More volatile eluents, such as cyclohexane, do not require a trap. If a hood is inconvenient, house vacuum may be used in its place.

The supply of liquid to be evaporated, the supply of non-reactive gas and its heating, and the ending of evaporation can all be controlled automatically, by use of an electronic controller 22 which receives signals from two thermocouples 23 and 24 and supplies 110 volt AC power to the two solenoid valves and the heater. When evaporation is initiated, the controller turns on the heater, and when the temperature of the HTR thermocouple 23 reaches the temperature set on the control for the non-reactive gas (for example, 35° C.) the controller turns on the, e.g., nitrogen supply 25. The stream of hot nitrogen entering the container passes to the side of the LQD thermocouple 24 situated so as to be contacted by the liquid in the container when it has risen to the highest desirable level. The nitrogen that leaves the container after impacting upon the liquid fraction heats the LQD thermocouple 24 up to the temperature set on a LQD control. The controller then opens the Teflon solenoid valve 6 between the reservoir and container permitting the liquid to flow from the reservoir into the fraction container. The flow continues until the liquid reaches the highest desirable level, touching the LQD thermocouple and thereby cooling it. The controller then stops the flow. The liquid is thereby transferred from the reservoir to the container so that as the evaporation proceeds the liquid level is maintained in the fraction container 7.

The HTR thermocouple 23 measures the temperature at a point near the exit line of the heated gas which is a measure of the gas temperature. It is connected to an HTR control in the electronic controller 22. The HTR control is set to the maximum temperature to which the nitrogen can be heated without damaging the apparatus or the liquid fraction. The HTR control is also controlled by the LQD thermocouple 24 so that when the Teflon solenoid valve 6 is open the heater is off.

When the liquid in the reservoir is completely emptied, the LQD thermocouple 24 remains uncovered and thus heated, causing the Teflon solenoid valve 6 to remain open and the heater to be off most of the time. This input signals to the controller 22 that the evaporation will soon be complete. A preset length of time passes, and the controller then shuts off the heater 17 permanently. However, during this waiting period, while the last traces of liquid are being evaporated, the preset LQD temperature is maintained in the fraction container 7.

When the heaer 17 is shut off permanently, the temperature of the HTR thermocouple 23 goes below the setting of the LQD control and the Teflon solenoid valve 6 closes. When the HTR thermocouple reaches the setting of the non-reactive gas control, the solenoid valve 14 closes, completely shutting down the apparatus.

One of ordinary skill in the art will recognize that any suitably electrically connected heat sensor means may be used in place of thermocouples, which are presented as non-restrictive examples only. Such alternative means include thermistors and resistance temperature detectors.

The sensing of the the temperature of the incoming gas and temperature within the container is important to the automatic control provided. The vaccum flask 9 insulates the system, preventing heat loss, enabling the desired temperature to be maintained, and the end of the evaporation to be sensed. Although the vacuum flask has proven to be a desirable embodiment, more rugged foam insulated flasks, which are less expensive, may also be employed. The thick Viton gasket material 10 used to seal the vacuum provides an excellent seal, however, it contains an extractable oil which could contaminate a liquid fraction. Therefore, it is used to seal against only the vapor phase. The liquid preferably comes in contact with only Teflon or glass, and to this end, Teflon tubing is preferably used for transferring the liquid fraction from the reservoir to the container.

It is apparent that a number of operating parameters can be optimized for the evaporation of particular fractions. Although this optimization would be in the experimental skill of one of ordinary skill in the art, some average values have been established. Typical sample evaporation rates range from 1 ml per minute for pyridine to 5 ml per minute for pentane. With cyclohexane as the eluent to be evaporated, an average rate was about 3 ml per minute in both a 17 ml vial with 5 sq.cm of surface area and a 4 oz jar with 16 sq.cm of surface area. These rates ideally allow for automated overnight operation.

The limitation on the evaporation rate is the wattage of the heater used to raise the temperature of the non-reactive gas. Higher wattage heaters may be employed if higher evaporation rates are desired.

Similarly, the 1 mm internal diameter of the hot nitrogen jet described is an average value. For single phase liquids which evaporate smoothly a larger diameter would permit a higher nitrogen flow rate which, if coupled with a higher wattage heater, would give higher evaporation rates. However, for multiphase liquids, a smaller diameter would increase the power to break up a non-volatile surface layer, thereby penetrating to the layer to be evaporated, and give better results with this type of fraction. Interchangeable nozzles could be used to increase efficiency for evaporation of a wide variety of fractions. A plurality of nozzles would be useful in a larger apparatus. A plurality of fraction containers may also be employed.

The settings on the electronic controller given above are not critical. The unit will operate over a wide range of settings on a given fraction. However, there are, as noted above, optimum settings for best results. Some factors to be considered in arriving at the optimums are as follows:

(1) The LQD control temperature is usually set about 15° C. below the boiling point of the fraction. At very low LQD settings, if the HTR is set high, the fraction container will fill. At very high LQD settings, if the HTR is set too low, the liquid will not feed at all.

(2) The HTR control temperature is set as high as possible, short of a temperature which will damage either the sample or the apparatus. Generally, samples are not altered by heating, as long as liquid is present, so that this setting can be about 200° C. Even with this high HTR setting, the temperature of the dry residue never goes much above the LQD setting, since the HTR is also shut off by the LQD control.

(3) Lower HTR settings will give slower evaporations.

(4) The non-reactive gas control ($N_2$ control) is usually set about 10° C. above room temperature. If set high, the nitrogen will be shut off before the residue has cooled. This might be done if complete evaporation is not desired. However, the non-reactive gas control should always be set lower than the HTR temperature. If set too low, the nitrogen will not be shut off at all. This might be done if evaporation at or below room temperature is wanted.

(5) The pre-set waiting period is designed to give the desired length of time to apply heat and nitrogen after the reservoir is emptied. When set at a maximum, the heat and nitrogen will continue until stopped manually. When set at a minimum, some liquids will be left in the residue.

(6) The rate of evaporation may be increased by maintaining the insulated flask and fraction container at pressures above atmospheric pressure.

Although the above described process of hot jet evaporation clearly demonstrates the superiority of the claimed invention over prior art evaporation processes, the invention has additional advantages. It is frequently desirable to divide the evaporated fraction into a number of homogeneous samples which can be subjected to further testing and analysis. The process and apparatus disclosed herein makes such aliquoting of a fraction for several tests far easier and more convenient than the prior art. Under prior art processes, the entire fraction is evaporated to constant weight to obtain the yield. This is a tedious procedure. The resulting residue is difficult to remove from the container, so that only a part of it can be used for test purposes. Since high molecular weight materials will solidify first, segregation of the components can occur. Thus, the material scraped out for the different tests may have different compositions, resulting in erroneous data.

These difficulties can be overcome by using the process and apparatus of this invention in the following manner:

1. Weigh the fraction container.
2. Set the evaporator to stop before evaporation is complete.
3. Weigh the fraction container after adding some solvent, if necessary, to obtain a homogeneous solution.
4. Remove suitably sized aliquots for various analytical tests into containers suitable for test processing.
5. Evaporate a small aliquot in a metal container to obtain an accurate yield.

For most of the tests, complete solvent removal is not necessary, so these evaporations will require only a short time.

If the test containers are also pre-weighed, the resulting solutions can be made up to a desired weight dilution. This will avoid the waste of sample, contamination and labor associated with unnecessary transfers to volumetric flasks larger than required.

With an electronic balance, weight measurements can be made in less time than volume measurements. Diluting to some even excessive volume is not necessary. The necessary calculations can be made easily.

By using the process described above, all of the fraction can be used for test purposes; and the tests will represent the original composition. Less sample will, therefore, have to be processed and the results will be obtained sooner with less labor. As the fractions are entirely homogeneous, erroneous data can be avoided.

Figure 2:
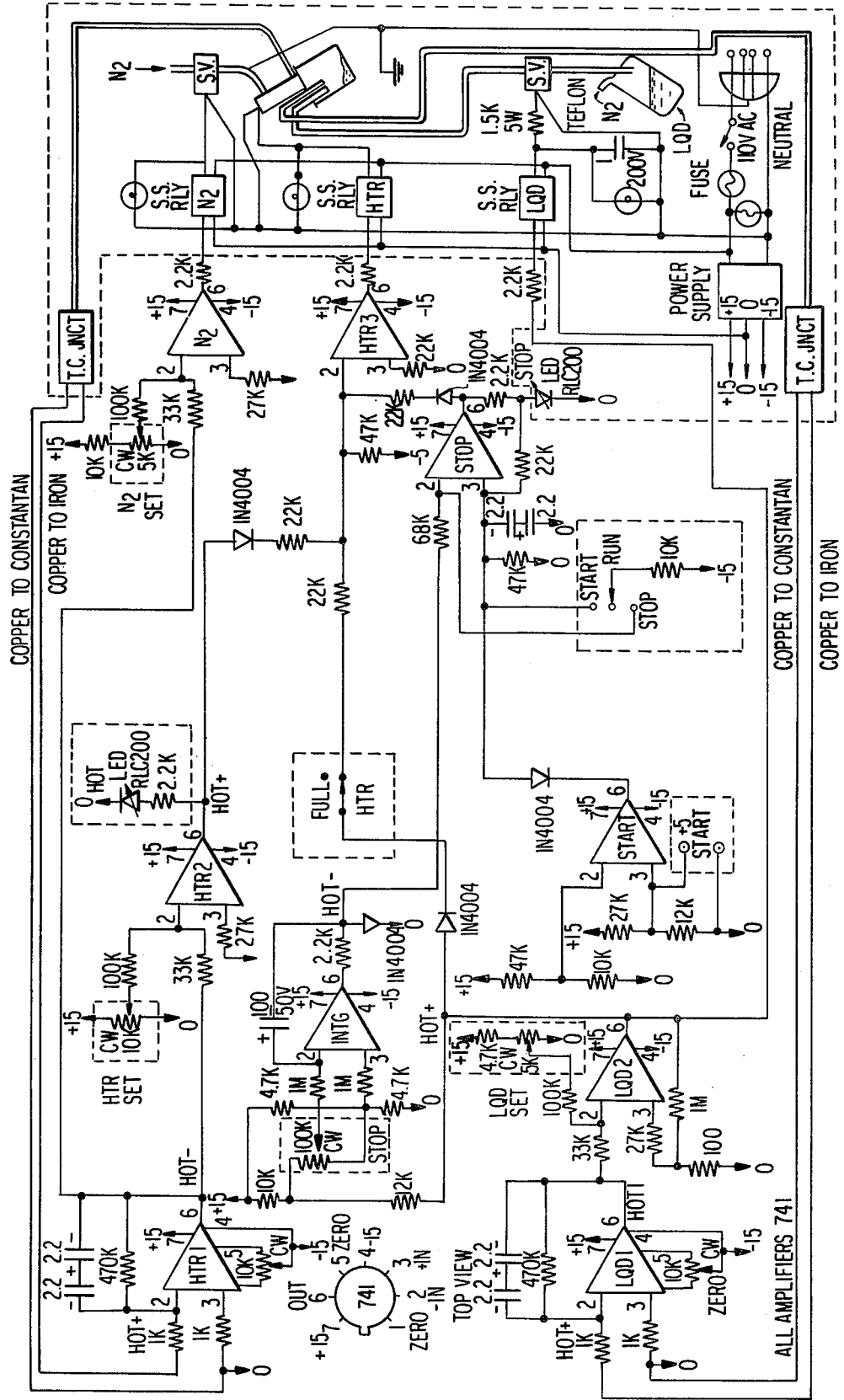
FIG. 2 is a circuit drawing of the control system of the apparatus of a preferred embodiment of this invention.

As noted above, since the requirement for manual control by skilled labor is avoided, the entire evaporation process may be automated, and even done overnight. For such automatic control, and electronic controller of the type described above, or a suitable computer substitute, is necessary. A circuit diagram of the electronic controller described above is shown in FIG. 2. All of the components, except those enclosed in dotted lines, are capable of being mounted on a small, e.g., 4.5×6.5 inch circuit board. The potentiometers to set the temperatures and delay time are on the front panel, along with necessary pilot lights and switches.

The thermocouples employed are all 30 gauge (0.010 inches) iron constantan 30 inches long. The cold junctions are at room temperature. They lead to preamplifiers which amplify the signals from the thermocouples from 0.05 millivolts per °C. to 25 millivolts per °C. Capacitors in the feed-back loops remove noise. All amplifiers are type 741.

The output of HTR 1 is applied to HTR 2 and $N_2$. The $N_2$ SET potentiometer applies biase to the input of $N_2$ so that when the temperature increases to the said value the solid state relay $N_2$ (S.S. RLY $N_2$) will open the $N_2$ solenoid valve 14. The HTR set potentiometer applies bias to the input of HTR 2 so that when the temperature increases to the set value the positive voltage applied through the diode to the input of HTR 3 causes its output to become negative which causes the relay (S.S. RLY HTR) to turn the heater off.

The output of LQD 1 is applied to LQD 2. The LQD SET potentiometer applies bias to the input of LQD 2 so that when the temperature increases to the set value the relay (S.S. RLY LQD) will open the Teflon solenoid valve 6 causing liquid to be fed to the container. The output of LQD 2 also goes to HTR 3 through a diode so that when the temperature increases to the LQD SET value the heater will be turned off. Turning off of the heater by the LQD SET can be prevented by opening the FULL HTR switch.

The output of the LQD 2 also goes through the STOP potentiometer to the integrator (INTG). The resistor network biases the inputs positive. A diode prevents the output from going positive. Thus the correct polarity is maintained on the 100-microfarad integrating capacitor. This has a 50 volt rating to give low leakage. When the LQD thermocouple 24 is uncovered it becomes hot which makes the input to the integrator positive which makes its output negative and charges the capacitor. This occurs while the Teflon valve 6 is open. While the Teflon valve 6 is closed the capacitor is discharging. While liquid is available to cool the LQD thermocouple 24 the Teflon valve 6 is open less than half of the time so that the capacitor never becomes fully charged. When the reservoir 2 becomes empty the Teflon valve 6 remains open most of the time and the capacitor charges to −9 volts. The rate of charging is set by the STOP potentiometer. The −9 volt output of the integrator is applied to the STOP circuit which causes its output to be positive which causes HTR 3 to turn off the heater. The positive output is also applied to the STOP non-inverting input which keeps the output permanently positive so that the heater remains off. If any one or more of the diodes supplies a positive voltage to pin 2 of HTR 3 the heater will be turned off. With the heater off the LQD thermocouple 24 will cool and close the Teflon valve 6. When it has cooled to the value on the $N_2$ SET the nitrogen 25 will be turned off by solenoid valve 14 and the run is completed.

The next run can be started by setting the manual START switch to START and then RUN. This resets the STOP circuit, making its output negative again. Remote starting can be done by connecting a switch or transistor in a computer to the START terminals of the START circuit.

The invention disclosed above has been described by reference to specific embodiments. It will be apparent to one of ordinary skill in the art that various changes and modifications may be made therein without departing from the spirit of the invention.

I claim:

1. An evaporator for the evaporation of a liquid fraction, comprising:
    a container wherein said fraction may be evaporated,
    a nozzle connected to a source of non-reactive gas and spatially situated so as to direct a stream of non-reactive gas exiting therefrom onto the liquid fraction within the container,
    an insulated flask and gasket surrounding and sealing said container and nozzle such that the container and nozzle are protected from contamination and fraction vapors do not escape,
    a heater situated between the non-reactive gas source and nozzle and capable of heating the non-reactive gas prior to its exiting the nozzle, and
    means for automatically controlling the flow of non-reactive gas and the heater and for starting and stopping the operation of said evaporator, which comprises a thermocouple associated with said heater, a thermocouple associated with said container and a solenoid valve which controls the flow of non-reactive gas.

2. The evaporator of claim 1, wherein said evaporator further comprises a trap connected by a tube to said container and fed with air.

3. The evaporator of claim 1, wherein said evaporator further comprises a reservoir suitable for containing said liquid fraction, said reservoir connected by a tube to said container, and means for automatically controlling and maintaining transfer of said liquid fraction from the reservoir to the container through the tube such that the liquid level in the container is maintained constant during evaporation.

4. The evaporator of claim 2, wherein said evaporator further comprises a reservoir suitable for containing said liquid fraction, said reservoir connected by a tube to said container, and means for automatically controlling and maintaining transfer of said liquid fraction from the reservoir to the container through the tube such that the liquid level in the container is maintained constant during evaporation.

5. The evaporator of claim 3 or 4, wherein said automatic controlling means includes a solenoid valve for controlling flow from said reservoir to said container and wherein said thermocouples and said solenoid valves are suitably electronically connected in circuit to effect automatic control of the evaporator.

6. The evaporator of claim 5 in combination with a process unit, said evaporator comprising a means for feeding the fractions drawn off from the process unit into the container.

7. The evaporator of claim 6 in combination with a process unit, said evaporator comprising means for feeding the fractions drawn off from the process unit into the reservoir.

8. The evaporator of claim 7, wherein said process unit is a liquid chromatograph.

9. The evaporator of claim 7, wherein said process unit is an extractor.

10. The evaporator of claim 1, wherein said automatic means for stopping the operation of said evaporator comprises a sensing means which registers a drop in the temperature of the non-reactive gas.

11. The evaporator of claim 1, wherein said nozzle is so spatially situated, and said stream of non-reactive gas is at sufficient velocity such that said stream is able to penetrate any non-volatile liquid phase on top of said liquid fraction to be evaporated and impact directly upon said fraction.

12. The evaporator of claim 1, wherein said insulated flask is vacuum insulated.

* * * * *